US010429501B2

(12) United States Patent
Pineda-Deom

(10) Patent No.: US 10,429,501 B2
(45) Date of Patent: Oct. 1, 2019

(54) MOTORCYCLE BLIND SPOT DETECTION SYSTEM AND REAR COLLISION ALERT USING MECHANICALLY ALIGNED RADAR

(71) Applicant: Continental Automotive Systems, Inc., Auburn Hills, MI (US)

(72) Inventor: David Pineda-Deom, Tlajomulco de Zuniga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 812 days.

(21) Appl. No.: 14/973,832

(22) Filed: Dec. 18, 2015

(65) Prior Publication Data

US 2017/0176591 A1    Jun. 22, 2017

(51) Int. Cl.
| | | |
|---|---|---|
| *G01S 13/93* | (2006.01) | |
| *G01S 7/40* | (2006.01) | |
| *B60W 40/112* | (2012.01) | |
| *G08G 1/16* | (2006.01) | |
| *G06K 9/00* | (2006.01) | |

(Continued)

(52) U.S. Cl.
CPC ......... *G01S 13/931* (2013.01); *B60W 40/112* (2013.01); *G01S 7/4026* (2013.01); *G06K 9/00805* (2013.01); *G06K 9/209* (2013.01); *G08G 1/167* (2013.01); *B60W 2300/36* (2013.01); *B60W 2420/52* (2013.01); *B60Y 2200/12* (2013.01); *G01S 2013/0245* (2013.01); *G01S 2013/9332* (2013.01)

(58) Field of Classification Search
CPC .................. G01S 13/931; G01S 7/4026; G01S 2013/0245; G01S 2013/9332; B60W 40/112; B60W 2420/52; B60W 2300/36; G06K 9/209; G06K 9/00805; G08G 1/167; B60Y 2200/12

See application file for complete search history.

(56) References Cited

U.S. PATENT DOCUMENTS

| | | | | |
|---|---|---|---|---|
| 3,939,339 A | * | 2/1976 | Alphen | .................. B60Q 1/076 362/467 |
| 4,313,115 A | * | 1/1982 | O'Sullivan | ........... G01S 13/931 342/182 |
| 4,931,803 A | | 6/1990 | Shimko | |

(Continued)

OTHER PUBLICATIONS

I. Boniolo, S. M. Savaresi and M. Tanelli, "Lean angle estimation in two-wheeled vehicles with a reduced sensor configuration," 2012 IEEE International Symposium on Circuits and Systems, Seoul, 2012, pp. 2573-2576. doi: 10.1109/ISCAS.2012.6271830 (Year: 2012).*

*Primary Examiner* — Matthew M Barker

(57) ABSTRACT

A blind spot detection system for a motorcycle, which includes an accelerometer, a gyroscope, and a detection device for detecting the presence of a vehicle in at least one blind spot. The accelerometer detects a gravity force vector, and the gyroscope detects the position of the motorcycle relative to the gravity force vector such that a lean angle of the motorcycle is calculated. The detection device is then configured to maintain the same position of the motorcycle relative to the gravity force vector and compensate for the position of the motorcycle if the lean angle is greater or less than 90°, such that the detection device is able to detect the presence of the vehicle in the at least one blind spot, independent of the lean angle of the motorcycle.

13 Claims, 7 Drawing Sheets

(51) Int. Cl.
  *G06K 9/20* (2006.01)
  *G01S 13/02* (2006.01)

(56) References Cited

U.S. PATENT DOCUMENTS

| | | | |
|---|---|---|---|
| 5,952,961 A * | 9/1999 | Denninger | G01S 7/4004 |
| | | | 342/357.3 |
| 6,774,860 B2 * | 8/2004 | Downs | H01Q 1/185 |
| | | | 343/711 |
| 7,034,748 B2 | 4/2006 | Kajiya | |
| 7,451,994 B2 * | 11/2008 | Heitner | B62H 1/10 |
| | | | 280/288.4 |
| 8,398,277 B2 * | 3/2013 | Fritz | B60Q 1/12 |
| | | | 362/464 |
| 9,153,133 B1 * | 10/2015 | Lunsford | G08G 1/167 |
| 9,330,319 B2 * | 5/2016 | Jeon | G06T 7/73 |
| 9,718,465 B2 * | 8/2017 | Seagraves | B60W 30/04 |
| 9,896,142 B2 * | 2/2018 | Slaughter | B62J 6/001 |
| 2011/0291889 A1 | 12/2011 | Mayo | |
| 2012/0280853 A1 * | 11/2012 | Silander | G01S 7/295 |
| | | | 342/147 |
| 2013/0100287 A1 | 4/2013 | Chien et al. | |
| 2013/0311075 A1 | 11/2013 | Tran et al. | |
| 2014/0372074 A1 * | 12/2014 | Dribinsky | G01C 9/06 |
| | | | 702/154 |
| 2015/0294660 A1 * | 10/2015 | Stokes | G01S 15/96 |
| | | | 367/173 |

* cited by examiner

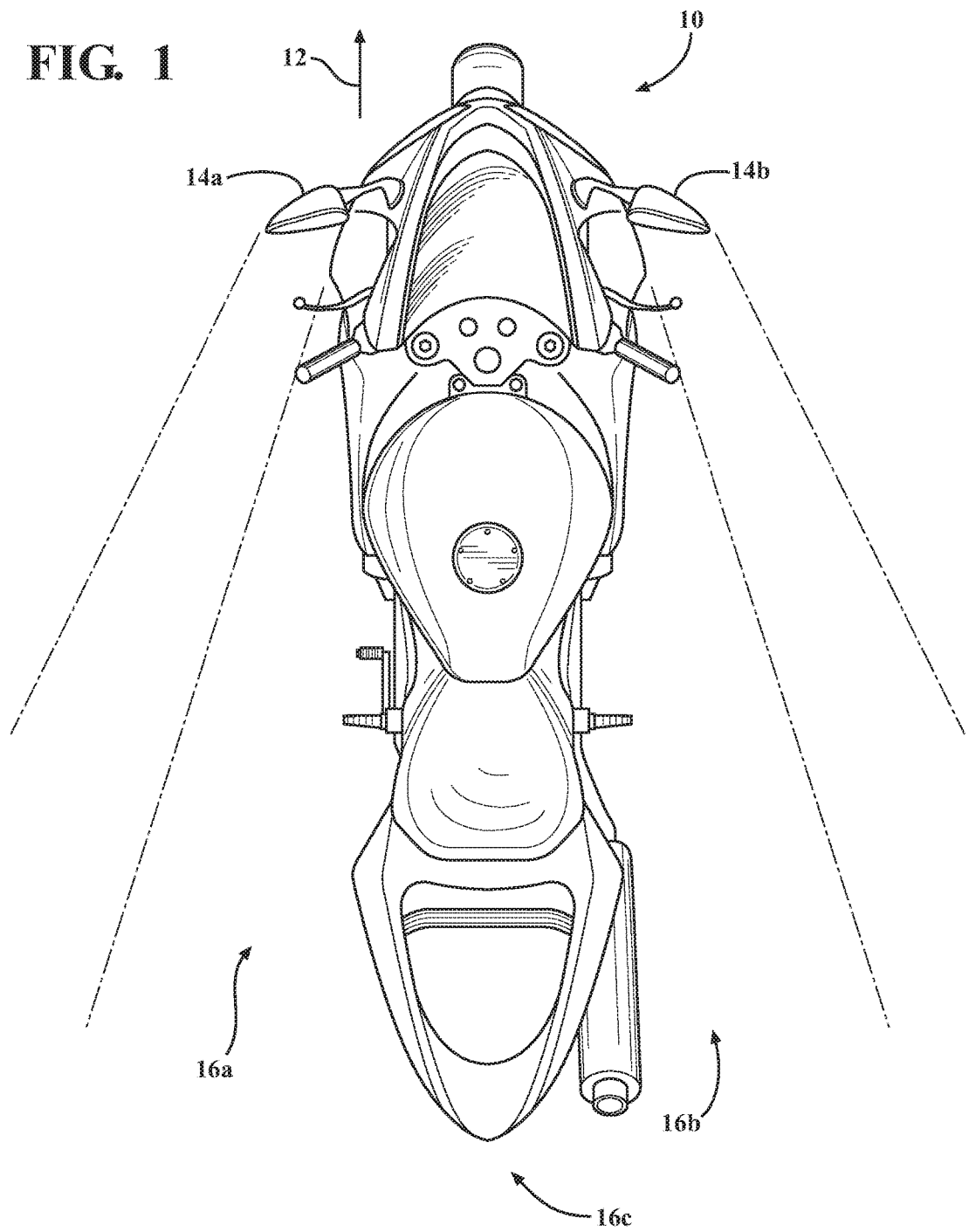

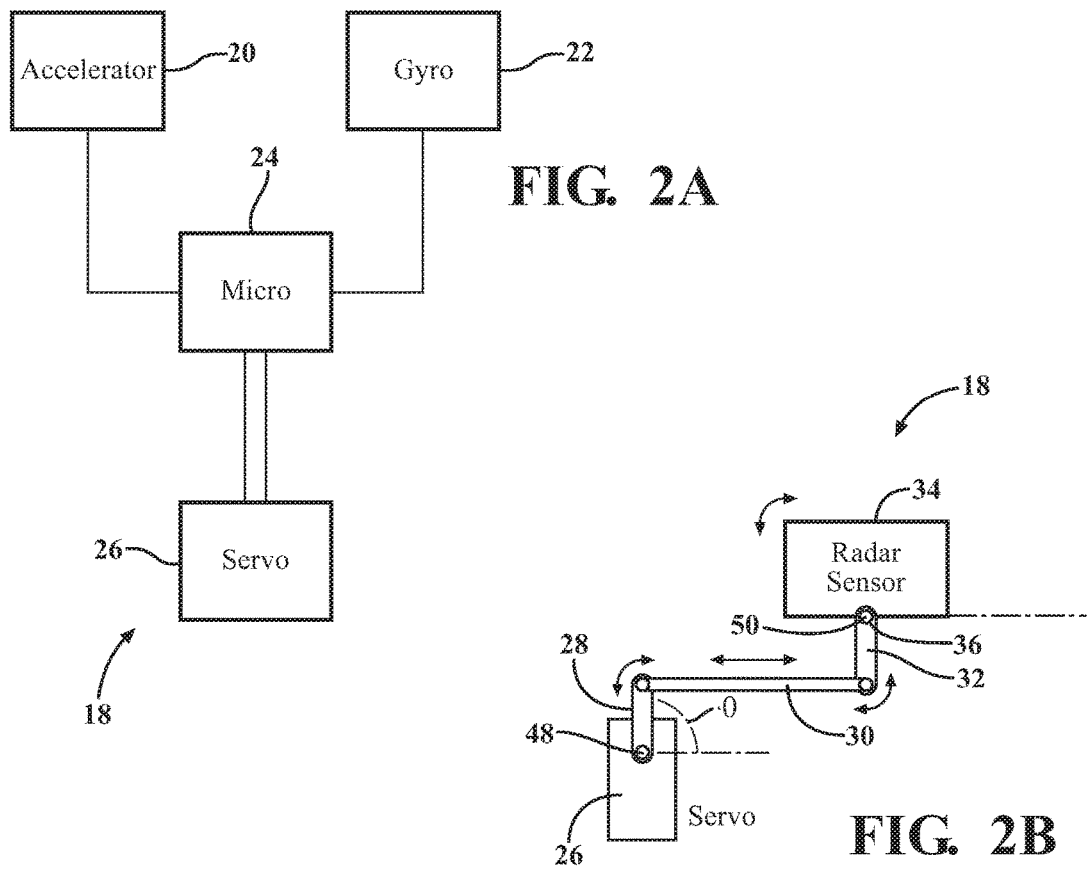
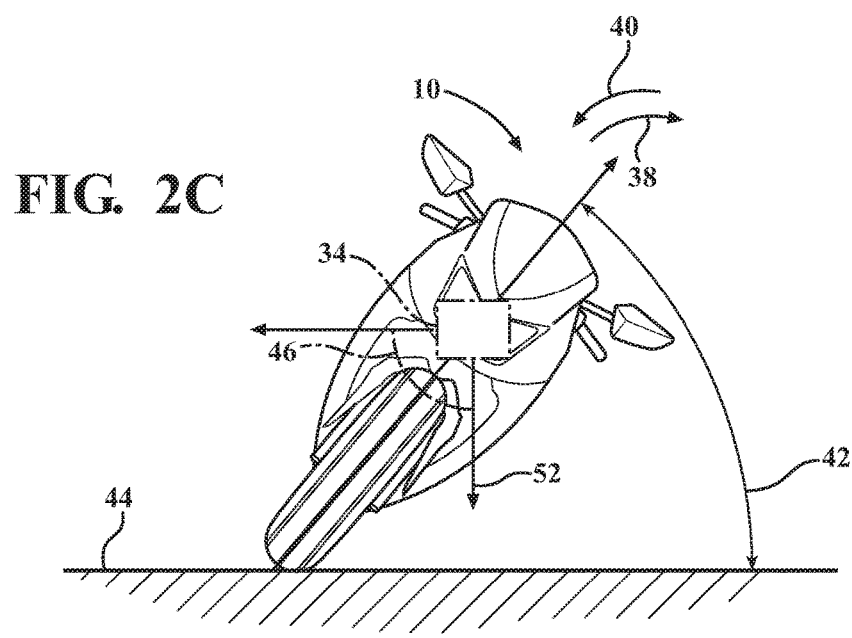

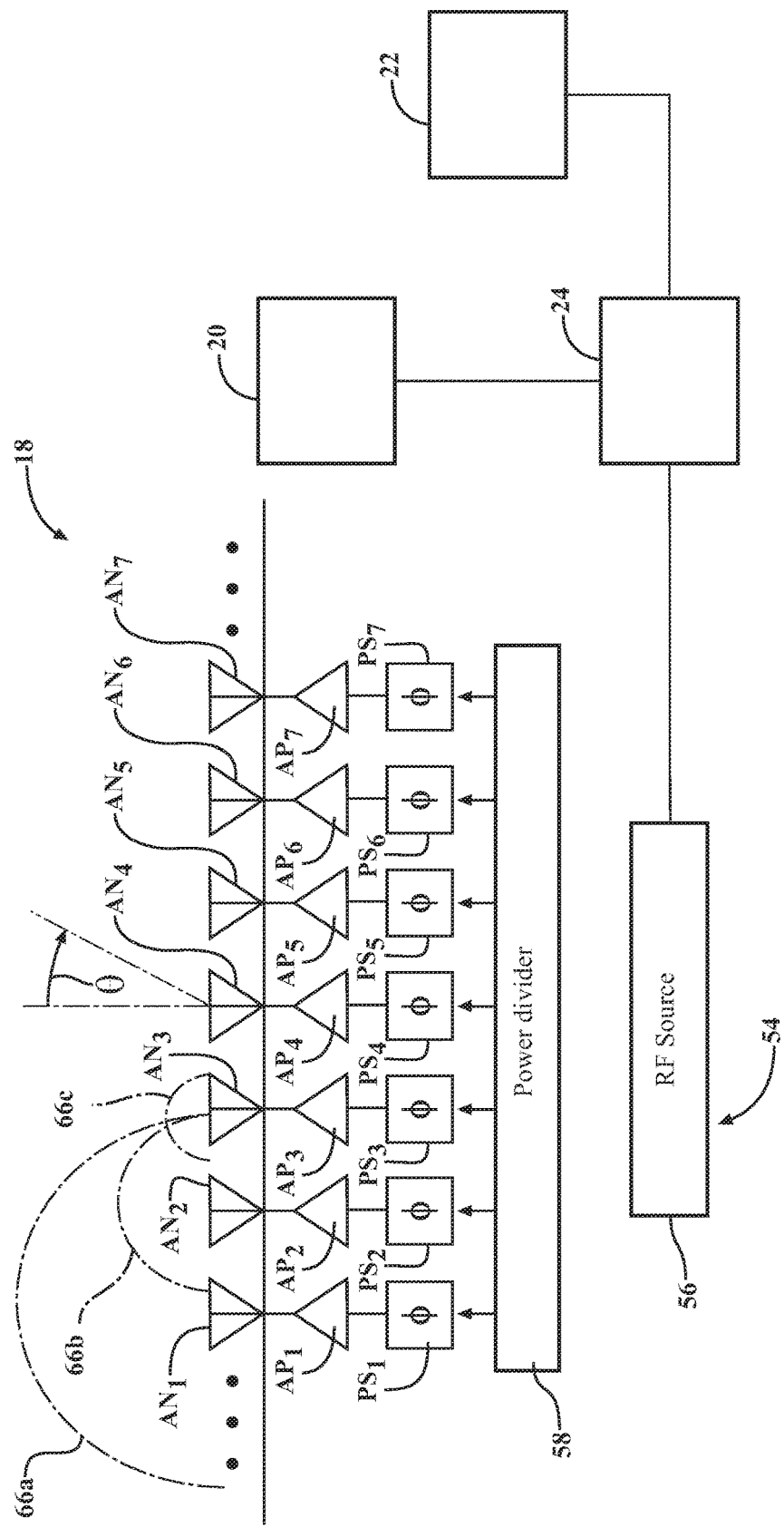

MOTORCYCLE BLIND SPOT DETECTION SYSTEM AND REAR COLLISION ALERT USING MECHANICALLY ALIGNED RADAR

FIELD OF THE INVENTION

The invention relates generally to a blind spot detection system for a motorcycle, which detects surrounding vehicles, independently of lean angle.

BACKGROUND OF THE INVENTION

Blind spot detection systems are generally known, and are used to detect surrounding vehicles that are not readily visible in one or more of the mirrors of a vehicle. Motorcycles have a greater blind spot area than most cars and trucks because the mirrors of a motorcycle are typically smaller, and there are typically only side mirrors on each side of the windshield, and no rearview mirror at the top of the windshield, as with a typical vehicle.

Furthermore, what is viewed in each side mirror changes as the motorcycle is navigating a turn because the motorcycle leans to one side or the other when navigating a turn. The degree to which the motorcycle leans, or is positioned at an incline relative to the road, is referred to as "lean angle." Even a small degree of lean angle may significantly affect what is viewable in the side mirrors of the motorcycle.

Because of the reduced ability to view surrounding vehicles when riding a motorcycle, the larger blind spot area, and the change in what is viewable in the side mirrors as the motorcycle is navigating a turn, riding a motorcycle therefore presents an increased risk of collision with another vehicle.

Blind spot detection systems are not generally used with motorcycles, and currently produced blind spot detection systems are not designed to be used with a motorcycle and compensate for the lean angle.

Accordingly, there exists a need for a blind spot detection system for use with a motorcycle, which has the ability to compensate for the lean angle of the motorcycle.

SUMMARY OF THE INVENTION

The present invention is a blind spot detection system for a motorcycle which has the ability to detect surrounding vehicles, independently of the lean angle of the motorcycle.

In one embodiment, the present invention is a blind spot detection system for a motorcycle, which includes an accelerometer, a gyroscope, and a detection device for detecting the presence of a vehicle in at least one blind spot. The accelerometer detects a gravity force vector, and the gyroscope detects the position of the motorcycle relative to the gravity force vector such that a lean angle of the motorcycle is calculated. The detection device is then configured to maintain the same position of the motorcycle relative to the gravity force vector and compensate for the position of the motorcycle if the lean angle is greater or less than 90°, such that the detection device is able to detect the presence of the vehicle in the at least one blind spot, independent of the lean angle of the motorcycle.

In one embodiment, the detection device is a radar sensor, and the degree which the radar sensor is rotated about the second axis corresponds to the lean angle of the motorcycle. The lean angle is less than 90° when the motorcycle leans in a first direction, and the lean angle is less than 90° when the motorcycle leans in a second direction.

The detection device also includes a servo, a first lever connected to the servo, a linkage member connected to the first lever, and a second lever connected to the linkage and the radar sensor. The servo rotates the first lever about a first axis, such that the linkage member rotates the second lever and the radar sensor about a second axis, and the servo maintains the position of the radar sensor relative to the gravity force vector.

In another embodiment, the detection device is a phased-array antenna assembly, which includes an RF source, a power divider in communication with the power source, a plurality of phase shifters in communication with the power source, a plurality of amplifiers, each of the plurality of amplifiers in communication with a corresponding one of the plurality of phase shifters, and a plurality of antennas in communication with a corresponding one of the plurality of amplifiers. The RF source generates a wave form which is divided by the power divider, such that a portion of the wave form passes through one of the at least two phase shifters, one of the at least two amplifiers, and one of the at least two antennas, creating a wave for detecting the presence of one or more vehicles in the at least one blind spot.

In yet other embodiments, a camera may be mounted to the motorcycle, and is used in place of the accelerometer and gyroscope. The camera is operable for use with either the radar sensor, or the phased-array antenna assembly. The camera detects a change in position of the motorcycle relative to a road surface, such that the lean angle of the motorcycle is calculated, and the either the radar sensor or the phased-array antenna assembly is configured to compensate for the position of the motorcycle if the lean angle is greater than or less than 90°, such that either the radar sensor, or the phased-array antenna assembly is able to detect the presence of other vehicles in the at least one blind spot, independent of the lean angle of the motorcycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a top view of a motorcycle having a blind spot detection system, according to embodiments of the present invention;

FIG. 2A is a diagram of part of a first embodiment of a blind spot detection system, according to embodiments of the present invention;

FIG. 2B is a second diagram of part of a first embodiment of a blind spot detection system, according to embodiments of the present invention;

FIG. 2C is a diagram of front view of a motorcycle having a blind spot detection system, according to embodiments of the present invention;

FIG. 3A is a diagram of part of a second embodiment of a blind spot detection system, according to embodiments of the present invention;

DETAILED DESCRIPTION OF THE PREFERRED EMBODIMENTS

Figure 3B:
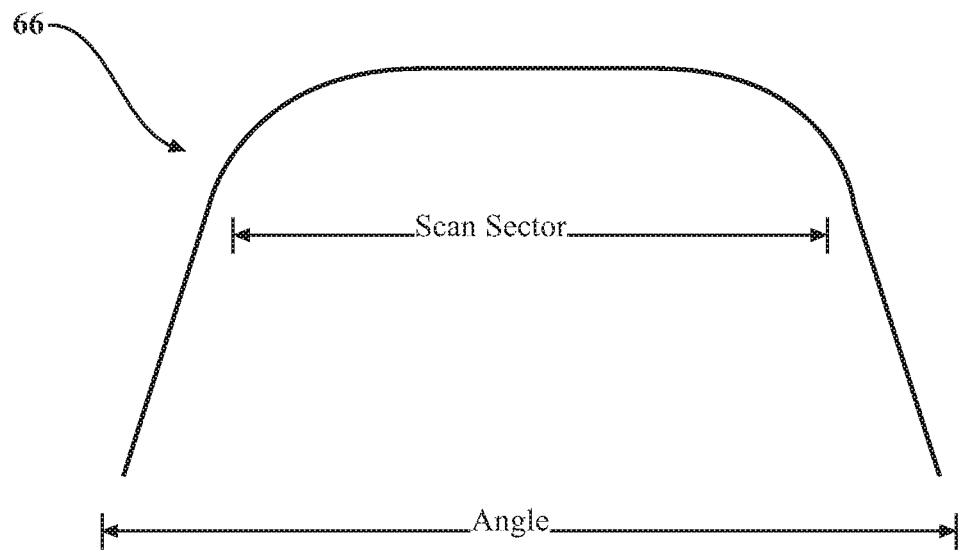
FIG. 3B is a uniform wave created by a phased-array antenna assembly, which is part of a second embodiment of a blind spot detection system, according to embodiments of the present invention.

The following description of the preferred embodiment(s) is merely exemplary in nature and is in no way intended to limit the invention, its application, or uses.

A diagram of a motorcycle having a blind spot detection system is shown in FIG. 1 generally at 10. When the rider of the motorcycle 10 is facing in a forward direction, as indicated by arrow 12, and uses either a first side mirror 14a or a second side mirror 14b, there several areas around the motorcycle 10 which are not visible to the rider. More specifically, there is a first blind spot area, shown generally at 16a, and a second blind spot area, shown generally at 16b, on each side of the motorcycle 10. There is also a rear area, shown generally at 16c, directly behind the motorcycle 10, which is also not readily visible to the rider, even when looking through the side mirrors 14a,14b. In order for the rider to determine if there is a vehicle in either of the blind spot areas 16a,16b, or in the rear area 16c, the rider must turn away from facing in the forward direction 12, and look to the side or behind the motorcycle 10, which then prevents the rider from seeing upcoming traffic in front of the motorcycle 10.

Referring generally to FIGS. 1-2C, to aid in alerting the rider of the motorcycle 10 of surrounding vehicles that are not readily visible in the side mirrors 14a,14b, and behind the motorcycle 10, the motorcycle 10 includes a blind spot detection system, shown generally at 18, which includes a device for measuring acceleration, which in this embodiment is at least one accelerometer 20, and a device for measuring orientation, which in this embodiment is at least one gyroscope 22. Both the accelerometer 20 and the gyroscope 22 are in communication with a processor 24, and the processor 24 is in communication with a servo 26. With reference to FIG. 2B, the servo 26 includes a first lever 28, the first lever 28 is pivotally connected to a linkage member 30, and the linkage member 30 is pivotally connected to a second lever 32. The second lever 32 is connected to a radar sensor 34, and the radar sensor 34 is pivotally mounted to the motorcycle 10 at a pivot mount 36. In FIG. 2C, the sensor 34 is shown mounted to the motorcycle 10 as part of a diagram for demonstrative purposes. However, it is within the scope of the invention that the servo 26 and the sensor 34 may be mounted to the motorcycle 10 in any suitable location, without affecting the operation of the servo 26 or the sensor 34.

When the motorcycle 10 is maneuvering a turn, the motorcycle 10 leans in one of two directions, depending upon the direction of the turn. The motorcycle 10 may lean in a first direction, as shown by first arrow 38 in FIG. 2C, or a second direction, as shown by second arrow 40. The degree which the motorcycle 10 leans in either direction 38,40 depends how aggressive the rider is when turning, this is referred to as the lean angle 42. If the sensor 34 were rigidly connected to the motorcycle 10, the sensor 34 would then rotate the same amount as the motorcycle 10. The pivot mount 36 allows the sensor 34 to move relative to the motorcycle 10. In order for the sensor 34 to accurately detect surrounding vehicles in either of the blind sports 16a,16b, or in the rear area 16c, the sensor 34 must remain horizontal relative to the motorcycle 10. The angle of the sensor 34 relative to a gravity force vector, shown by arrow 52, is the sensor angle 46, which is held as close to 90° as possible.

The sensor angle 46 is controlled by the servo 26. The servo 26 in this embodiment is an electronic actuator, but it is within the scope of the invention that other types of actuators may be used. The servo 26 pivots the lever 28 about a first axis 48, which in turn moves the linkage member 30, causing the linkage member 30 to pivot relative to the first lever 28 and second lever 32, causing the second lever 32, and therefore the sensor 34, to pivot about a second axis 50, which extends through the pivot mount 36.

During the operation of the motorcycle 10, the motorcycle 10 may lean in either the first direction 38 or the second direction 40, where the motorcycle 10 is positioned at a lean angle 42 that is greater or less than 90°. This may occur when the rider has stopped, and placed one foot on the road 44, or when the motorcycle 10 is navigating a turn, or during other operating conditions as well.

Upon start-up of the motorcycle 10, the accelerometer 20 detects the gravity force vector 52 in FIG. 2C. Once the gravity force vector 52 is detected, the gyroscope 22 is then used to detect the lean angle 42 of the motorcycle 10. If the lean angle 42 is greater or less than 90°, the servo 26 rotates the lever 28 about the first axis 48, which in turn moves the linkage member 30, causing the linkage member 30 to pivot relative to the first lever 28 and second lever 32, and the second lever 32, and therefore the sensor 34, to pivot about the second axis 50. The degree to which the sensor 34 is pivoted about the axis 50 depends on the lean angle 42 of the motorcycle 10. As the motorcycle 10 leans in either direction 38,40, the servo 26 leans as well, and the first lever 28 needs to remain in the same position as the motorcycle leans 10, such that the sensor 34 is maintained in the same position. The greater the lean angle 42 in either direction away from 90°, the more the sensor 34 is pivoted about the axis 50. For instance, if the motorcycle 10 is leaned in the first direction 38, and the lean angle 42 is less than 90°, such as 80°, for example, the servo 26 rotates the sensor 34 an angular distance of 10° opposite of the first direction 38 to correspond to the amount of lean angle 42 of the motorcycle 10.

In another example, if the motorcycle 10 is leaned in the second direction 40, and the lean angle 42 is greater than 90°, such as 110° for example, the servo 26 then rotates the sensor 34 an angular distance of 10° opposite of the second direction 40 to correspond to the amount of lean in the motorcycle 10. While the two examples have been described, it is within the scope of the invention that the servo 26 is used to rotate the sensor 34 at any angle to compensate for the motorcycle 10 leaning any angular distance in either direction 38,40.

It should also be noted that the orientation of the levers 28,32 may be varied, such that the servo 26, levers 28,32, linkage member 30, and sensor 34 may be located in different configurations relative to the motorcycle 10, and to each other, and still function in the desired manner, where during the operation of the motorcycle 10, the sensor angle 46 is held as close to 90° as possible.

Another embodiment of the invention is shown in FIGS. 3A-3F, with like numbers referring to like elements. In this embodiment, the servo 26, levers 28,32, and linkage member 30 are eliminated. This embodiment includes a phased-array antenna assembly, shown generally at 54.

The assembly 54 includes an RF source 56 which is in communication with a power divider 58. The power divider 58 is in communication with a plurality of phase shifters PS. In FIG. 3A and for purposes of illustration, there are seven phase shifters $PS_1, PS_2, PS_3, PS_4, PS_5, PS_6, PS_7$ shown, but it is within the scope of the invention that more or less phase shifters $PS_1, PS_2, PS_3, PS_4, PS_5, PS_6, PS_7 \ldots PS_n$ may be used. Each phase shifter $PS_1$-$PS_n$ is connected to a corresponding amplifier AP. More specifically, there are seven amplifiers $AP_1, AP_2, AP_3, AP_4, AP_5, AP_6, AP_7$, shown in FIG. 3A for purposes of illustration, but it is within the scope of the invention that more or less amplifiers $AP_1, AP_2, AP_3, AP_4, AP_5, AP_6, AP_7, \ldots AP_n$ may be used. Each amplifier $AP_1 \ldots AP_n$ is connected to a corresponding antenna element AN, such that there are seven antenna elements $AN_1, AN_2, AN_3, AN_4, AN_5, AN_6, AN_7$, shown in FIG. 3A which correspond to the phase shifters $PS_1, PS_2, PS_3, PS_4, PS_5, PS_6, PS_7$ and the amplifiers $AP_1, AP_2, AP_3, AP_4, AP_5, AP_6, AP_7$. However, it is also shown in FIGS. 3C and 3D that there are many more antennas $AN_1 \ldots AN_n$, where each antenna AN is mounted to a base plate 72, and the base plate 72 is mounted to the motorcycle 10, as shown in FIG. 3E.

The RF source 56 provides a wave form (such as a sine wave) that is divided by the power divider 58 into individual paths, where each individual path includes a phase shifter PS, an amplifier AP, and an antenna element AN. If there is no phase shifting of the output of each of the antenna elements $AN_1 \ldots AN_n$, then the signal from the RF source 56 produces a wave 66 which is relatively uniform in shape, as shown in FIG. 3B.

Figure 3C:
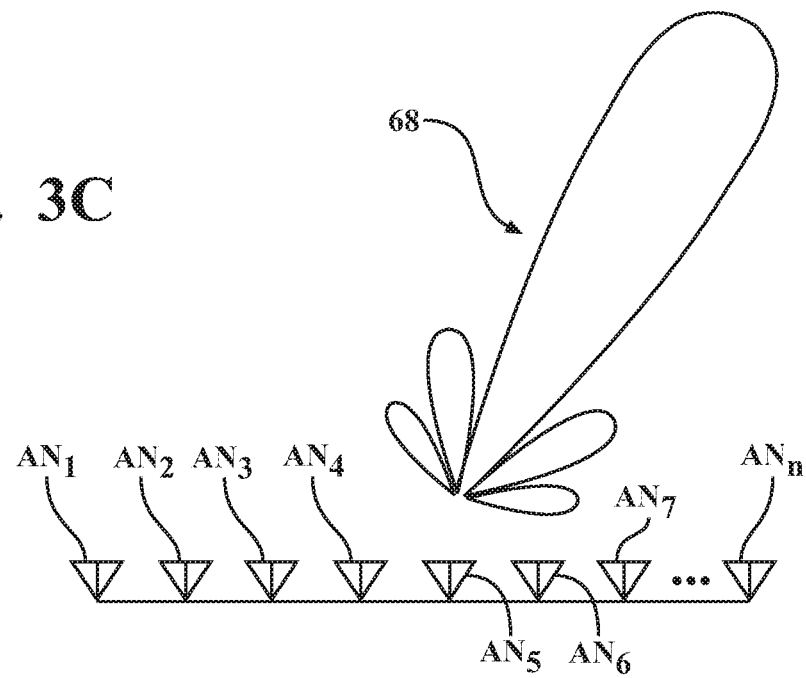
FIG. 3C is an example of a wave emitted at a desired angle, which is part of a second embodiment of a blind spot detection system, according to embodiments of the present invention.
Figure 3D:
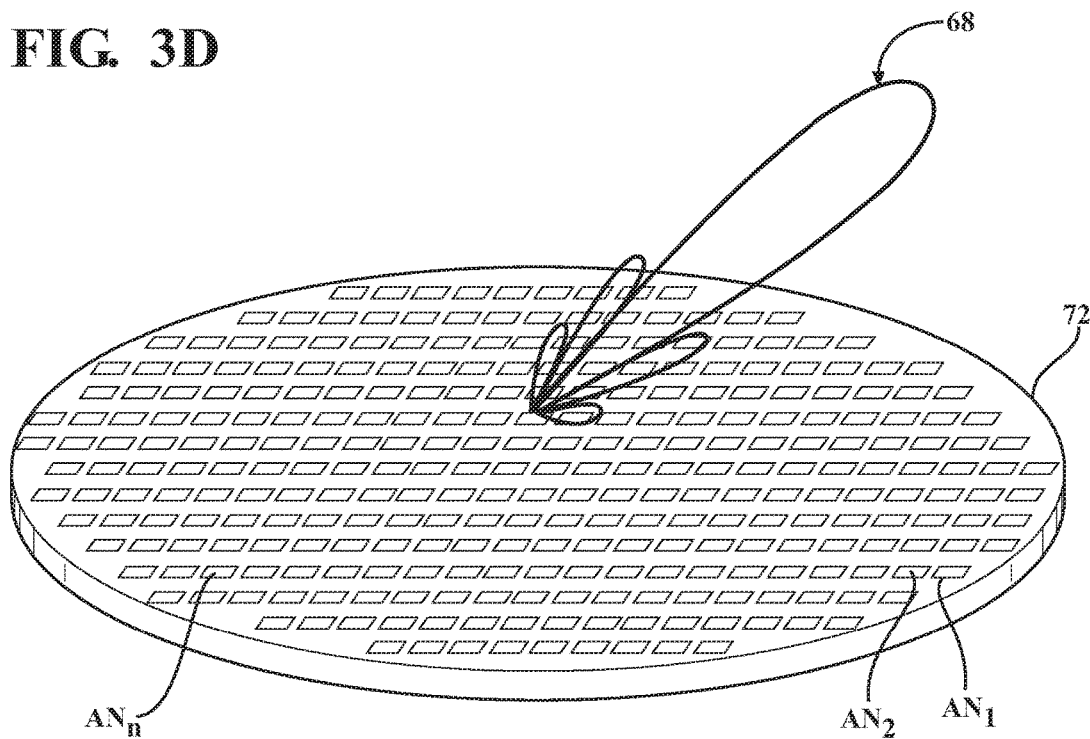
FIG. 3D is perspective view of a base plate having multiple antenna elements, which is part of a second embodiment of a blind spot detection system, according to embodiments of the present invention.
Figure 3E:
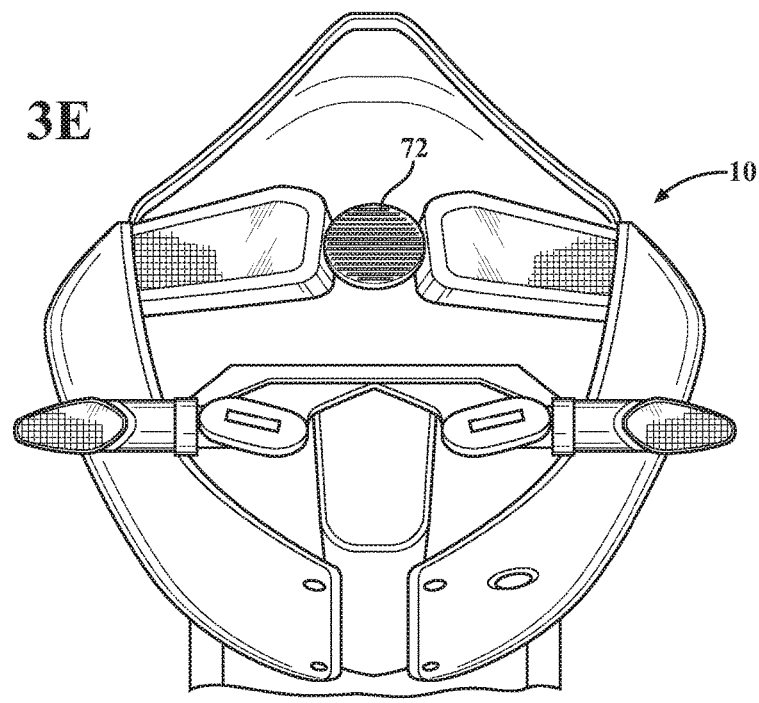
FIG. 3E is a rear view of a motorcycle having a base plate with multiple antenna elements, which is part of a second embodiment of a blind spot detection system, according to embodiments of the present invention.

If phase shifting occurs, then the wave 66 is of a different shape than what is shown in FIG. 3B. The phase shift may be a result of time domain, or frequency domain. Each of the paths is able to be pulsed separately to form the phase shift. For example, the first phase shifter $PS_1$, amplifier $AP_1$, and antenna $AN_1$ are used to create a first pulse, represented graphically in FIG. 3A at 66a, the second phase shifter $PS_2$, amplifier $AP_2$, and antenna $AN_2$ are then used to create a second pulse 66b, with the second pulse 66b being slightly smaller than the first pulse 66a because the second pulse 66b was emitted after the first pulse 66a, and the third phase shifter $PS_3$, amplifier $AP_3$, and antenna $AN_3$ are then used to create a third pulse 66c, with the third pulse 66c being slightly smaller than the second pulse 66b because the third pulse 66c was emitted after the second pulse 66b. The process continues until all of the individual paths have been pulsed. Each pulse combines to produce a single wave 68 which is emitted from the antennas $AN_1 \ldots AN_n$ at a desired angle, an example of which is shown in FIGS. 3C and 3D.

In this embodiment, the accelerometer 20 and the gyroscope 22 function in the same manner as described in the previous embodiment. The accelerometer 20 detects the gravity force vector 52, and the gyroscope 22 is then used to detect the lean angle 42 of the motorcycle 10. During operation, when the motorcycle 10 is traveling down the road 44, and the lean angle 42 is 90°, the emitted pulses from the individual paths may be used to produce the uniform wave 66. However, when the lean angle 42 is greater or less than 90° the emitted pulses from the individual paths, and therefore the wave 66 emitted from the assembly 54 is altered to compensate for the lean angle 42. The wave 66 that is emitted may also change shape as the motorcycle 10 is leaning in the first direction 38 or the second direction 40. The wave 68 shown in FIGS. 3C and 3D compensates for the lean angle 42. The wave 68 may be created by the use of any combination of the phase shifters $PS_1$-$PS_n$, amplifiers $AP_1 \ldots AP_n$, and antenna elements $AN_1 \ldots AN_n$. to create the desired wave 68 for object detection in the blind spots 16a,16b, and rear area 16c, and compensate for changes in the lean angle 42.

It is shown in FIG. 3D that the base plate 72 is mounted to the motorcycle 10 as shown, but it is within the scope of the invention that the base plate 72 may be mounted to the motorcycle 10 in any suitable location, as long as the assembly 54 is still able to detect surrounding vehicles in the blind spot areas 16a,16b, and the rear area 16c.

Figure 3F:
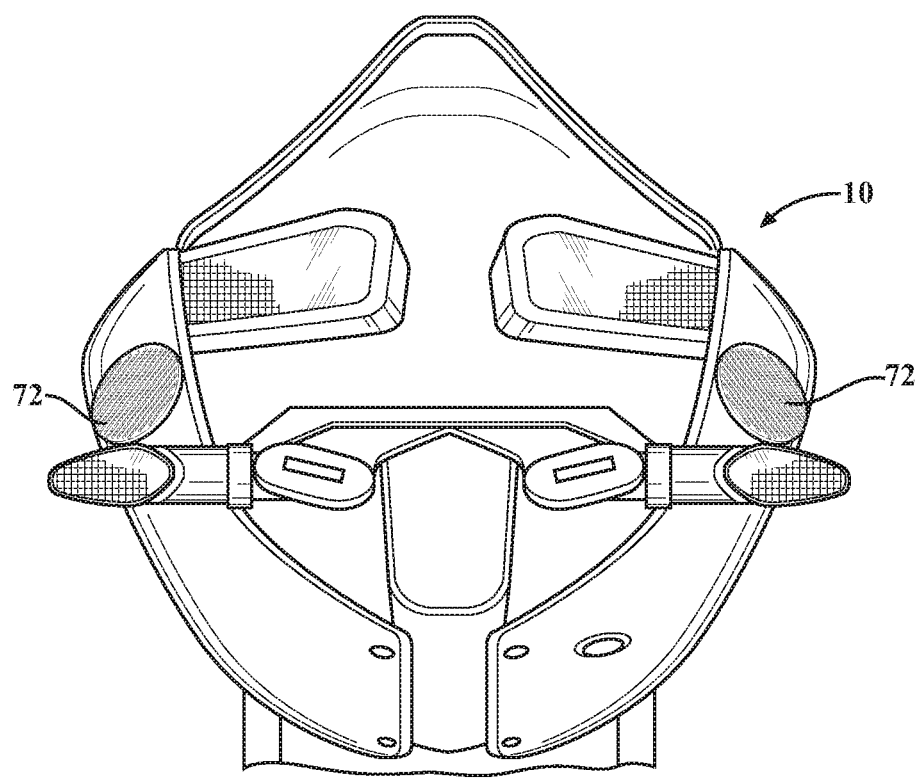
FIG. 3F a rear view of a motorcycle having two base plates with multiple antenna elements, which is part of a second embodiment of a blind spot detection system, according to embodiments of the present invention.

Another example of this embodiment is shown in FIG. 3F, where there are two base plates 72 having the antenna elements $AN_1 \ldots AN_n$ mounted on each side of the motorcycle 10. Having a base plate 72 mounted on each side of the motorcycle 10 increases the range of coverage to beyond the 16a,16b, and the rear area 16c, and also provides detection of vehicles which are adjacent the motorcycle 10 as well.

Figure 4:
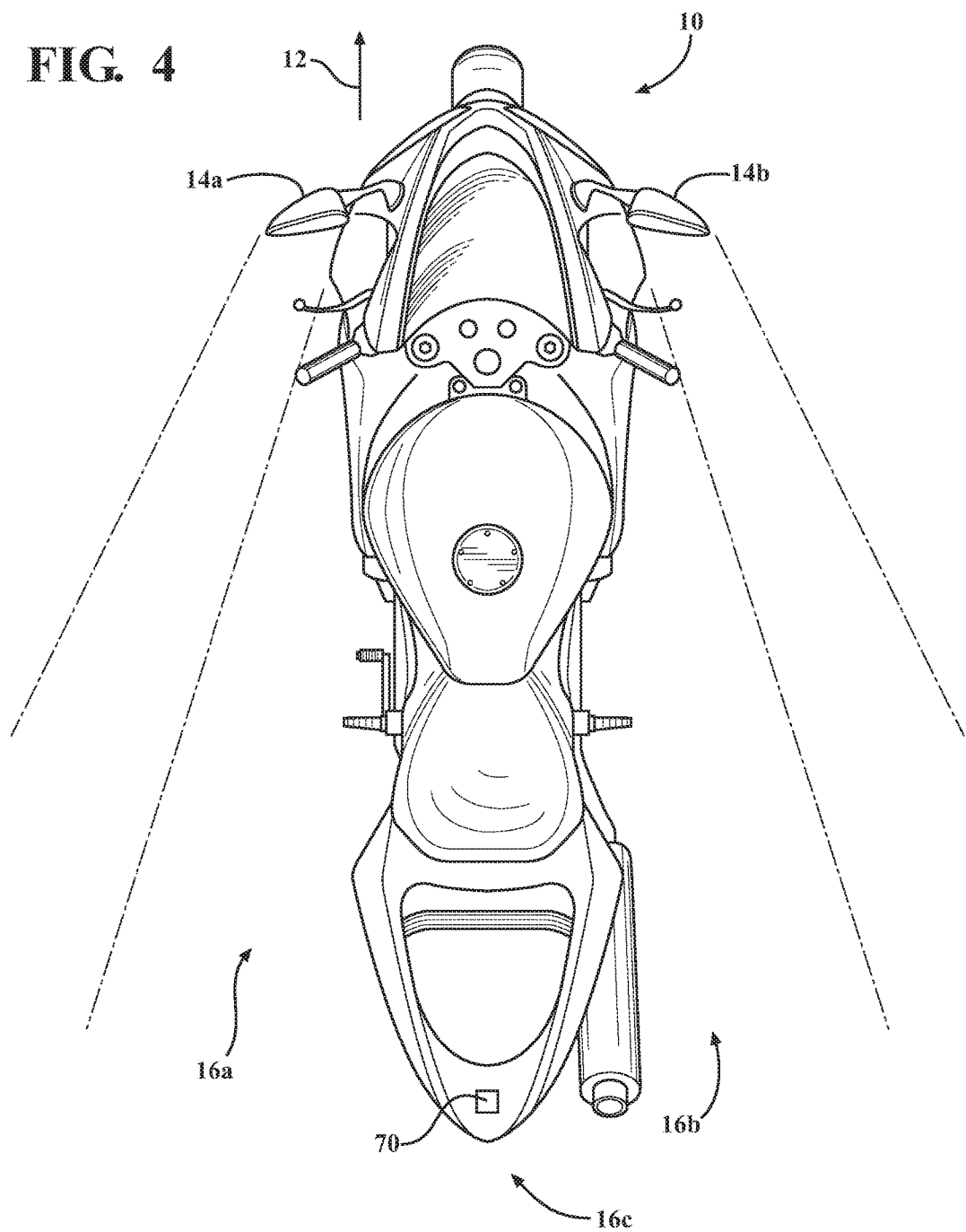
FIG. 4 is a top view of a motorcycle having another embodiment of a blind spot detection system, according to embodiments of the present invention.

A third embodiment of the invention is shown in FIG. 4, with like numerals referring to like elements. This embodiment includes a camera 70, mounted on the motorcycle 10. In this embodiment, the accelerometer 20 and gyroscope 22 are eliminated, and the camera 70 is used to detect the lean angle 42 of the motorcycle 10. Once the lean angle 42 is detected, the servo 28 is then used to rotate the lever 28 about the axis 48 as described above to maintain the sensor angle 46 as close to 90° as possible. In a fourth embodiment, the camera 70 may be used with the phased-array antenna assembly 54, where the camera detects the lean angle 42 of the motorcycle 10, and the assembly 54 is used to produce the wave 66 (which compensates for the lean angle 42) to detect other vehicles in each blind spot 16a,16b and rear area 16c. In both the third and fourth embodiments, the camera 70 is used to detect the lean angle 42 relative to the surface of the road 44, and operation of the radar sensor 34 or the phased-array antenna assembly 54, depending upon the embodiment, are changed based on the lean angle 42 detected by the camera 70.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blind spot detection system for a motorcycle, comprising:
    a motorcycle;
    a device for measuring acceleration mounted to the motorcycle;
    a device for measuring orientation mounted to the motorcycle;
    a processor in communication with the device for measuring acceleration and the device for measuring orientation; and
    a detection device for detecting the presence of other vehicles in at least one blind spot;
    wherein the device for measuring acceleration detects a gravity force vector, and the device for measuring orientation detects the position of the motorcycle relative to the gravity force vector such that a lean angle of the motorcycle is calculated with the processor, and the detection device is configured to maintain the same position relative to the gravity force vector and compensate for the position of the motorcycle if the lean angle is greater than or less than 90°, such that the detection device is able to detect the presence of other vehicles in the at least one blind spot, independent of the lean angle of the motorcycle.

2. The blind spot detection system for a motorcycle of claim 1, wherein the lean angle is less than 90° when the motorcycle leans in a first direction, and the lean angle is less than 90° when the motorcycle leans in a second direction.

3. The blind spot detection system for a motorcycle of claim 1, the detection device further comprising a radar sensor.

4. The blind spot detection system for a motorcycle of claim 3, the detection device further comprising an actuator connected to the radar sensor, wherein the actuator maintains the position of the radar sensor relative to the gravity force vector, to compensate for the change in lean angle of the motorcycle.

5. The blind spot detection system for a motorcycle of claim 4, the detection device further comprising:
   a first lever connected to the actuator;
   a linkage member connected to the first lever; and
   a second lever connected to the linkage and the radar sensor;
   wherein the actuator rotates the first lever about a first axis, such that the linkage member rotates the second lever and the radar sensor about a second axis.

6. The blind spot detection system for a motorcycle of claim 4, the actuator further comprising a servo.

7. The blind spot detection system for a motorcycle of claim 1, the device for measuring acceleration further comprising an accelerometer.

8. The blind spot detection system for a motorcycle of claim 1, the device for measuring orientation further comprising a gyroscope.

9. A blind spot detection system for a motorcycle, comprising:
   a motorcycle;
   an accelerometer mounted to the motorcycle;
   a gyroscope mounted to the motorcycle;
   a processor in communication with the accelerometer and the gyroscope; and
   a detection device mounted to the motorcycle, the detection device for detecting the presence of a vehicle in at least one blind spot;
   wherein the accelerometer detects a gravity force vector, and the gyroscope detects the position of the motorcycle relative to the gravity force vector such that a lean angle of the motorcycle is calculated with the processor, and the detection device is configured to maintain the same position relative to the gravity force vector and compensate for the position of the motorcycle if the lean angle is greater or less than 90°, such that the detection device is able to detect the presence of the vehicle in the at least one blind spot, independent of the lean angle of the motorcycle.

10. The blind spot detection system for a motorcycle of claim 9, the detection device further comprising a radar sensor.

11. The blind spot detection system for a motorcycle of claim 10, the detection device further comprising:
   a servo;
   a first lever connected to the servo;
   a linkage member connected to the first lever; and
   a second lever connected to the linkage and the radar sensor;
   wherein the servo rotates that first lever about a first axis, such that the linkage member rotates the second lever and the radar sensor about a second axis, such that the servo maintains the position of the radar sensor relative to the gravity force vector.

12. The blind spot detection system for a motorcycle of claim 11, wherein the degree which the radar sensor is rotated about the second axis corresponds to the lean angle of the motorcycle.

13. The blind spot detection system for a motorcycle of claim 9, wherein the lean angle is less than 90° when the motorcycle leans in a first direction, and the lean angle is less than 90° when the motorcycle leans in a second direction.

* * * * *